Nov. 1, 1927.
O. TANGRING
GAUGE
Filed April 19, 1926
1,647,552
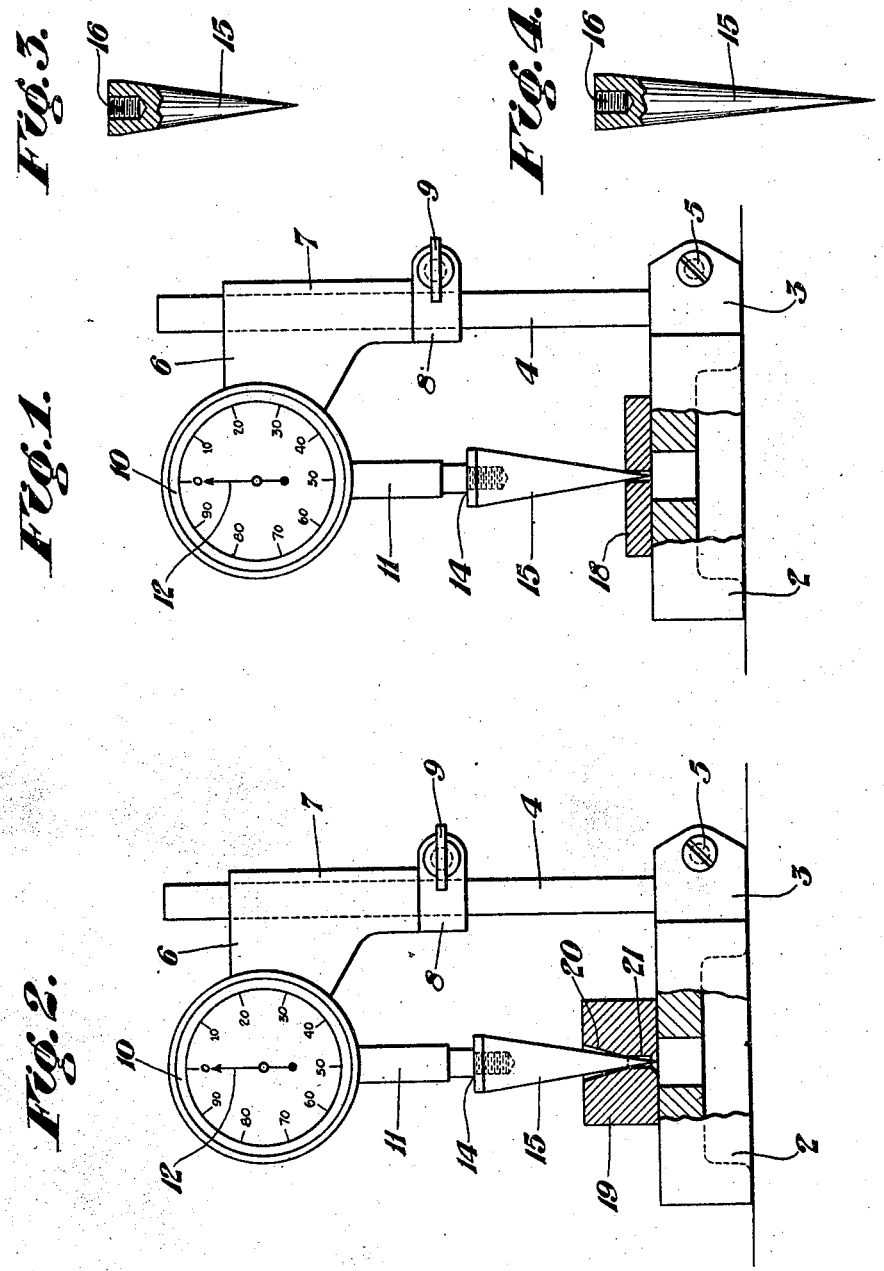
Witnesses:
Inventor:
OLOF TANGRING,
his Attorney.

Patented Nov. 1, 1927.

1,647,552

UNITED STATES PATENT OFFICE.

OLOF TANGRING, OF WORCESTER, MASSACHUSETTS, ASSIGNOR TO THE AMERICAN STEEL AND WIRE COMPANY OF NEW JERSEY, A CORPORATION OF NEW JERSEY.

GAUGE.

Application filed April 19, 1926. Serial No. 103,066.

This invention relates to gauges and more particularly to gauges for gauging the length of the bearing portions of wire drawing dies, and has for its object the provision of a gauge by which the length of the bearing portions of wire drawing dies may be accurately and quickly gauged.

The bearing of a wire drawing die is that slightly tapered portion of the hole which has the least diameter and which gives the wire its required size. Wire drawing dies whether made of cast iron or forged steel, must have the proper length of bearing, since the length of the bearing determines the length of service of the hole, that is, a hole with a standard length of bearing will permit more bundles of wire to be drawn through it than one with a shorter length of bearing.

Heretofore there has been no means provided for accurately determining or gauging the length of the bearing of the holes in a wire drawing block, with the result that the length of the bearing portions of the dies have varied.

In the drawings—

Figure 1 is a front elevation of a gauge constructed in accordance with this invention and showing a template in position for setting the gauge.

Figure 2 is a similar view showing a die in position to be gauged.

Figures 3 and 4 are elevations of the different pointers or gauge tools for use with the gauge.

Referring more particularly to the drawings, the numeral 2 designates the base of the gauge apparatus, which is provided with a split socket 3 at one side adapted to receive an upright rod or post 4. The socket 3 is provided with a clamping screw 5 for clamping the socket around the post 4.

An indicator support or bracket 6 having a tubular portion 7 is slidably mounted on the post 4 and its downward movement is limited by a split collar 8 which is adjustable on the post 4 and adapted to be locked in position by a thumb-screw 9.

An indicator 10 of any standard design and construction which has a plunger 11 adapted to move a hand 12 in either direction from zero in response to a vertical movement of the plunger is mounted on the support or bracket 6.

The lower end of the plunger 11 is threaded as at 14, and tapered or cone-shaped gauge tools or points 15 provided with threaded recesses or sockets 16 are removably threaded thereon and are adapted to fit within the die holes in the drawing dies. The tools or points 15 may have varying tapers and consequently be of varying lengths as shown in Figures 3 and 4.

In operation, a template 18 having the proper length and diameter of bearing for the die to be gauged is placed on the base 2. The correct type of tool or point 15 is then selected and mounted on the plunger 11. The bracket 6 is then adjusted vertically on the post 4 so that when the tool or point 15 is engaged with the bearing of the template 18, the indicator 10 will read zero. The bracket 6 is then prevented from moving downwardly by locking the collar 8 in position below the bracket 6.

The template 18 is then removed and a die plate 19 having die holes 20 is substituted therefor. The die plates 19, it will be understood, have the bearing portions 21 previously formed accurately therein, such bearing portions being accurately reamed to exact finish diameter prior to the reaming out and finishing of the cone shaped upper or entering side of the die holes 20. The tool or point 15 is then inserted in each of the holes 20 so that each may be gauged. Since the bearing portions 21 are all of the same and correct diameter, any variations in the length of the bearing portion 21 of the die holes 20 will register either plus or minus on the dial of the indicator 10, since the plunger 11 will move downwardly beyond its zero setting if the bearing is short, or will not move down to its zero setting if the bearing is long.

While I have shown and described one specific embodiment of my invention, it will be understood that I do not wish to be limited thereto since various modifications may be made without departing from the scope of my invention as defined in the appended claims.

I claim:—

1. Apparatus for gauging the length of bearings in wire drawing dies, comprising a base, a vertical post removably mounted in said base, a bracket mounted for vertical movement on said post, a vertically adjustable collar mounted on said post below said bracket for limiting the downward movement of said bracket, an indicator mounted on said bracket, said indicator being provided with a vertically movable operating plunger, and a gauging tool mounted on the lower end of said plunger and adapted to be entered in the openings in the die being gauged and engage the bearing portion of said openings so that variations in the length of the bearing portions will be indicated by said indicator.

2. Apparatus for gauging the length of bearings in wire drawing dies, comprising a base, a vertical post removably mounted in said base, a bracket mounted for vertical movement on said post, a vertically adjustable collar mounted on said post below said bracket for limiting the downward movement of said bracket, an indicator mounted on said bracket, said indicator being provided with a vertically movable operating plunger, and a conical gauging tool removably mounted on the lower end of said plunger and adapted to be entered in the openings in the die being gauged and engage the bearing portion of said openings so that variations in the length of the bearing portions will be indicated by said indicator.

In witness whereof, I have hereunto signed my name.

OLOF TANGRING.